(12) United States Patent
Sargent

(10) Patent No.: US 6,516,530 B1
(45) Date of Patent: Feb. 11, 2003

(54) SOLID CORE FIXTURE

(75) Inventor: Leigh R. Sargent, Plainfield, IN (US)

(73) Assignee: Applied Composites Engineering, Inc., Indianapolis, IN (US)

( * ) Notice: Subject to any disclaimer, the term of this patent is extended or adjusted under 35 U.S.C. 154(b) by 0 days.

(21) Appl. No.: 09/421,729

(22) Filed: Oct. 20, 1999

Related U.S. Application Data

(60) Provisional application No. 60/104,980, filed on Oct. 20, 1998.

(51) Int. Cl.[7] .............................. G01B 3/14; G01B 1/00
(52) U.S. Cl. .......................... 33/562; 33/567; 33/1 BB; 33/545
(58) Field of Search .......................... 33/562, 567, 502, 33/702, 703, 704, 705, 483, 492, 493, 1 V, 1 BB, 1 F, 545–547, 555.1, 555.2

(56) References Cited

U.S. PATENT DOCUMENTS

| | | | | |
|---|---|---|---|---|
| 1,728,420 A | * | 9/1929 | Little | 33/492 |
| 2,708,368 A | * | 5/1955 | Kolisch | 33/1 V |
| 3,934,352 A | * | 1/1976 | Quenot | 33/493 |
| 4,221,053 A | * | 9/1980 | Bobel, II et al. | 33/552 |
| 4,703,648 A | * | 11/1987 | Baresh | 33/552 |
| 4,899,507 A | * | 2/1990 | Mairlot | 52/222 |
| 5,291,661 A | * | 3/1994 | Kaizumi et al. | 33/288 |
| 5,461,795 A | * | 10/1995 | Kok | 33/493 |
| 5,472,168 A | * | 12/1995 | Tapp | 33/561.3 |
| 5,726,749 A | * | 3/1998 | Schave | 356/239 |
| 5,759,220 A | * | 6/1998 | Boaz | 65/102 |
| 5,913,585 A | * | 6/1999 | Pelland | 33/1 BB |
| 6,082,015 A | * | 7/2000 | Bjorkdahl | 33/555.2 |
| 6,138,371 A | * | 10/2000 | Lippa et al. | 33/1 V |

OTHER PUBLICATIONS

Compositech, Inc. Guaging Fixture, Circa 1996, Manufactured by Compositech, Inc.

* cited by examiner

Primary Examiner—Diego Gutierrez
Assistant Examiner—Yaritza Guadalupe
(74) Attorney, Agent, or Firm—E. Victor Indiano; Indiano, Vanghan & Roberts, P.A.

(57) ABSTRACT

A solid core fixture for measuring a workpiece and a method for making the same. The solid core fixture includes a solid core made of a homogeneous material, a skin layer covering the solid core, and a surface material covering a portion of the skin layer. The surface material is machined for measuring the workpiece. The skin layer preferably includes an inner skin covering the solid core, a skin core attached to the inner skin and an outer skin attached to the outer surface of the skin core, the three layers being molded in a single process and cured together. A method of making the solid core fixture includes the steps of fabricating a plug core from a homogeneous material; attaching the plug core to a base; applying a skin layer to the plug core and the base; curing the skin layer; covering a portion of the skin layer, after curing, with a surface material; and machining the surface material for measuring the workpiece. Preferably, the applying a skin layer step comprises the steps of: applying an inner skin layer over the plug core; applying a skin core over the inner skin layer; and applying an outer skin layer over the skin core; then the curing step is performed on all layers of the skin layer during a single curing time.

17 Claims, 2 Drawing Sheets

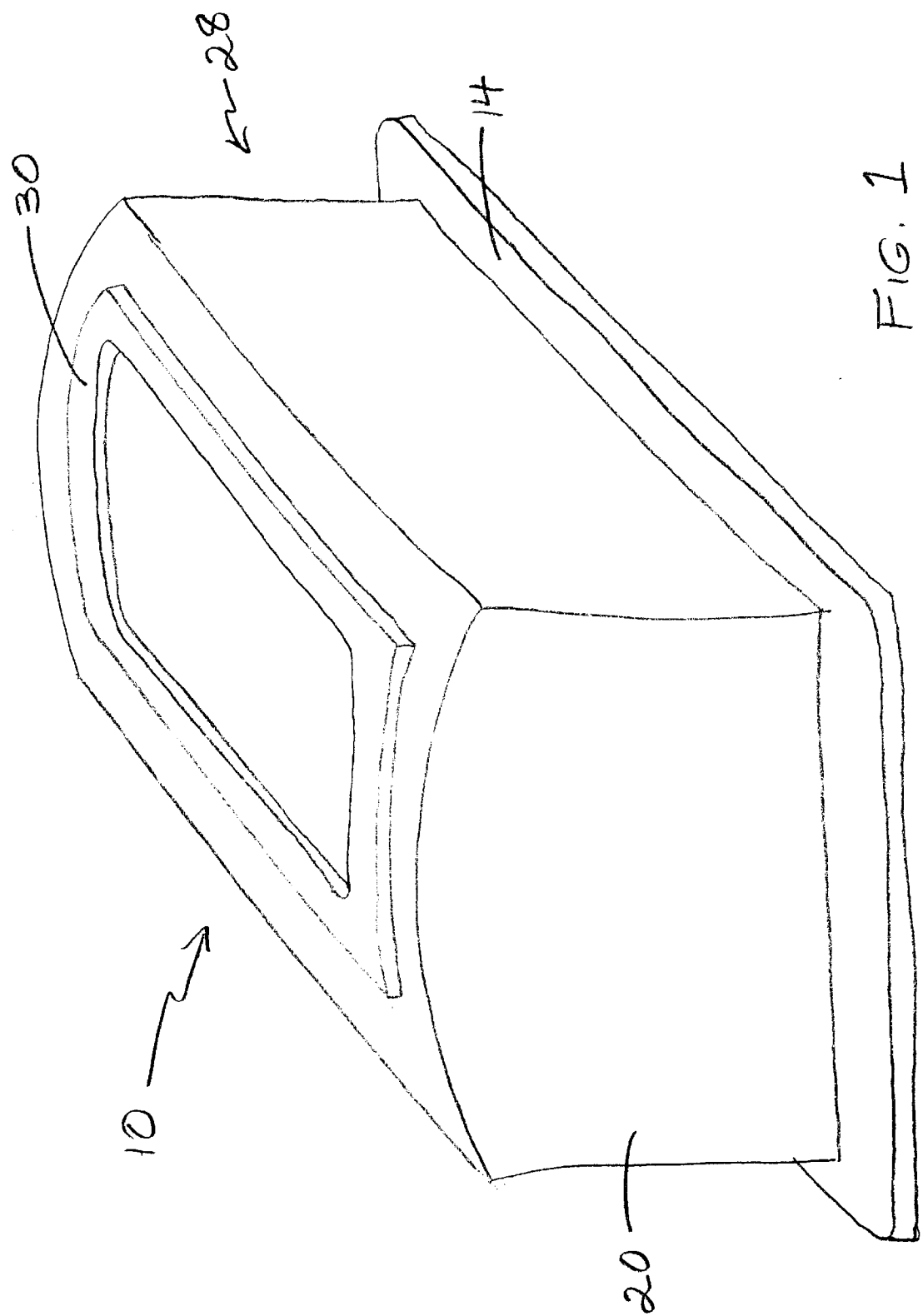

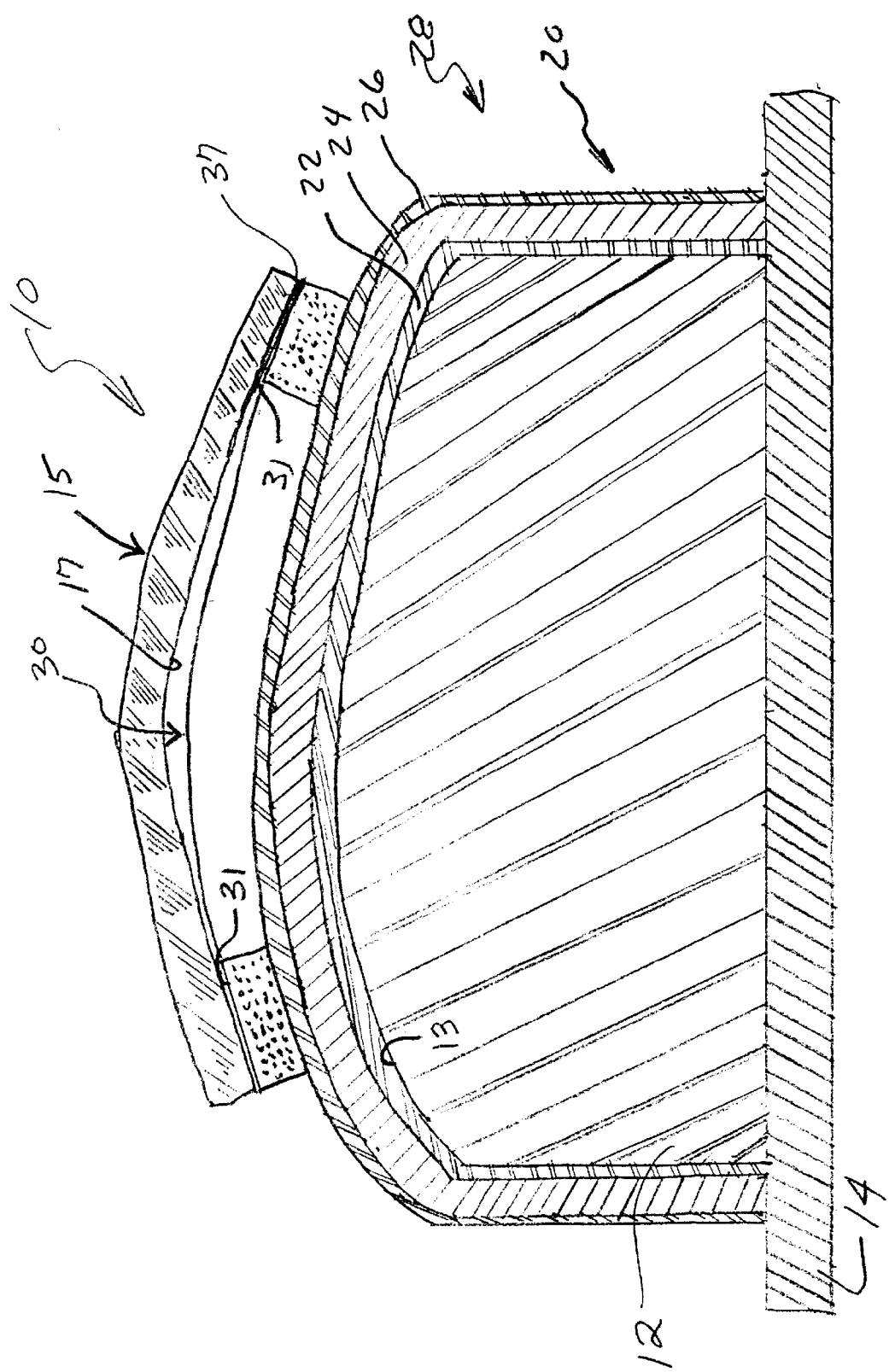

SOLID CORE FIXTURE

This application claims priority to U.S. Provisional Patent Application, Ser. No. 60/104,980, which was filed on Oct. 20, 1998.

FIELD OF THE INVENTION

This invention relates to a fixture for measuring the size and shape of an article. More particularly, the invention concerns a fixture having a solid core and an outer skin that is formed over the solid core, the outer skin being machined for measuring the size and shape of the article.

BACKGROUND OF THE INVENTION

Fixtures on which a workpiece, such as a sheet of automobile windshield glass, can be placed for the measurement of the size and shape of the workpiece are well known. A portion of the fixture is typically machined to have the desired shape of the workpiece to be measured, and to have the desired size and/or markings which indicate the desired size of the workpiece to be measured. When the workpiece is placed on the fixture, the deviations between the desired size and shape of the workpiece and the actual size and shape of the workpiece are quantified.

The material and manufacturing costs of high precision fixtures which function well over an extended time and over varying environmental conditions can be extremely expensive. Homogeneous solid core fixtures, such as mahogany, can expand and contract due to environmental conditions, such as humidity and temperature, and also change with age as the wood dries out. This affects the measurements obtained using the fixture and makes it unsuitable for high-precision applications. Solid fixtures are also heavy and may require forklifts or other special modes of transportation to move them, as occurs quite often in plants that manufacture a plurality of different workpieces, and thereby have a plurality of different fixtures.

One solution to this problem is to use the solid core as a general shape during the fabrication process and apply a skin over the solid core. Optimally, the skin material is chosen to exhibit very little change due to environmental conditions or aging. The skin can then be machined to the desired size and shape and its core removed. The fixture is then the skin which exhibits very little change in size and shape due to environmental conditions or aging. A disadvantage of this type of fixture is that the skin, without the core, lacks strength and structural rigidity. The skin fixture is susceptible to changes in shape or breakage due to the weight of the articles being measured, transport of the fixture and other factors indigenous to a manufacturing facility.

One remedy to help compensate for the fragile nature of the hollow core fixture is to add a support structure under the skin such as beams or a honeycomb structure. Such a support structure should be made of materials that will not change the shape of the skin due to environmental changes or aging. The support structure provides greater rigidity to the skin. However, additional steps and greater complexity of the fabrication process to add the support structure greatly increases the cost of this type of fixture.

Accordingly, a need exists for a fixture that maintains it shape with changes in environmental conditions and aging, yet is lightweight and is quick and inexpensive to fabricate. Therefore, one object of the present invention is to provide a fixture for measuring the size and shape of a workpiece, that is negligibly effected by changing environmental conditions and aging, is lightweight, and is quick and inexpensive to fabricate.

SUMMARY OF THE INVENTION

In accordance with the present invention a fixture is provided for measuring the size and shape of a workpiece. The fixture comprises a solid plug core that provides the general shape of the fixture during the fabrication process and is maintained in the fixture to provide additional strength and rigidity during usage of the fixture. The fixture includes a skin, comprising one or more layers for covering the plug core. The fixture also includes a surface material that is applied to a portion of the skin. The surface material is machined to meet the requirements for measurement of the particular workpiece(s) for which it is designed.

A feature of the present invention is that a fixture can be fabricated quickly and inexpensively. The plug core is used in the fabrication process and is not removed. The skin can be made in a one step process where the multiple skin layers are applied and a single curing period is used during which the skin layers are bonded. The plug core and skin only (without the surface material) provide the general shape of the fixture, thus they have very loose tolerances. Only the surface material needs to be machined to meet the required tolerances, thus permitting the fixture to be fabricated quickly and inexpensively.

Another feature is that the fixture can be made of relatively lightweight materials and yet have good strength and rigidity. The plug core provides strength and rigidity to the fixture. The skin can include a skin core which provides additional strength and rigidity in the skin layer, independent of the plug core. This enables the fixture to maintain good stability even when the plug core is made of an inexpensive, light weight material which is unstable or less stable than is required of the surface material.

Additional objects, advantages and novel features of the invention are set forth in the description that follows, and will become apparent to those skilled in the art upon reviewing the drawings in connection with the following description.

BRIEF DESCRIPTION OF THE DRAWINGS

FIG. 1 shows a perspective view of a solid core fixture; and

FIG. 2 shows a cross-section of the solid core fixture.

DETAILED DESCRIPTION OF THE PREFERRED EMBODIMENT OF THE INVENTION

FIG. 1 shows a solid core fixture 10 of the present invention and FIG. 2 shows a cross section of the solid core fixture 10. The solid core fixture 10 includes a main body 28 and a surface coating 30. The main body 28 includes a plug core 12, a base 14, a skin layer 20 including an inner skin layer 22, a skin core 24 and an outer skin layer 26. The plug core 12 is attached to the base 14. The skin layer 20 covers the plug core 12 and the base 14 thereby forming the main body 28. The surface coating 30 covers a portion of the main body 28 and is machined so that the fixture 10 can be utilized for the measurement of size and shape of a workpiece.

The plug core 12 is fabricated from a homogeneous material, such as polystyrene, urethane foam, vinyl foam, wood, or a honeycomb material. The plug core 12 can be fabricated by molding, machining or other fabrication process. The plug core 12 is made in the general shape of the desired fixture 10 but the tolerances of the plug core 12 are not critical. Preferably, the upper surface 13 of the plug core 12 is machined to match the curvature of the surface 17 of the workpiece 15 that will be placed on the upper surface 31 of the surface coating 30.

The main body 28 is formed by attaching the plug core 12 to the base 14 and performing a skin molding process to apply the skin layer 20 over the plug core 12 and the base 14.

The skin layer 20 consists of one or more layers, depending upon the strength, rigidity and cost requirements for the fixture 10, but preferably includes three layers, the inner skin layer 22, the skin core 24 and the outer skin layer 26. In the preferred fabrication process for the fixture 10, a one time skin molding process is performed in which all of the layers 22, 24, 26 of the skin layer 20, whether single or multiple layers, are applied in one step and then the completed skin layer 20 is allowed time to cure. The one time skin molding process allows for quicker and easier fabrication of the fixture 10.

During the skin molding process, an inner skin 22 is placed over the upper surface 13 of the plug core 12 the inner skin 22 extends over the plug core 12 to a point where it either meets or overlaps the base 14. The material used in the plug core 12 can limit the materials and process that can be used for the application of the inner skin 22. For example, an inner skin 22 made from a material requiring a high temperature application process is generally not suitable for use with a low temperature material for the plug core 12, such as polystyrene. It has been found that an inner skin 22 composed of dry carbon fiber and wet laminating epoxies works well.

In order to impart additional rigidity to the main body 28 of the fixture 10 and to give independent rigidity to the skin layer 20, a skin core 24 and an outer skin 26 can be applied during the skin molding process. The skin core 24 can be made of a foam, such as vinyl base or urethane core, or a honeycomb material. Either aluminum or a no-mix honeycomb core having a three pound density, available through Ciba Geigy, Textel, or Glasscore, serves well as the skin core 24. The skin core 24 can be included in the skin layer 20 on any combination of the top, sides or bottom surfaces of the plug core 12, depending upon the areas requiring additional rigidity in the skin layer 20.

An example of a one time skin molding process is to apply an inner skin 22 composed of carbon fiber and wet epoxy resins to the plug core 12. While the epoxy is still wet, a skin core 24 made of a honeycomb material can be attached to the inner skin 22 on the top and/or sides of the plug core 12, with the skin epoxy serving to bond the inner skin 22 and skin core together. An outer skin 26 composed of carbon fiber and wet epoxy can then be applied to cover the skin core 24. The wet epoxy of the inner skin 22 and of the outer skin 26 are thereby used to attach together the three layers of the skin layer 20 during a single curing period. If the skin layer 20 is composed of multiple layers, the multiple layers should be bonded together. Any of several methods of exerting a clamping force on the skin layer 20 can be used in bonding the multiple skin layers together. In one embodiment, the inner and outer skins are approximately $\frac{1}{16}$" of an inch thick, and the skin core is approximately 0.25 to 0.5 inches thick.

After the main body 28, consisting of the plug core 12 and the base 14 covered by the skin layer 20, is cured, the surface material 30 is applied to a portion of the main body 28. For automobile windshield workpieces, the surface material is applied in a ring which is sized and shaped to enable the perimeter 37 of the underside surface 17 of the windshield 15 to rest on the upper surface 31 of the surface material 30. In one embodiment, the surface material 30 is applied in a generally ring shape having a generally rectangular cross section with a height of about 0.5 inches before machining, and about 0.25 inches after machining. In this embodiment, the width of the ring is between about 3.0 and 4.0 inches.

The surface material 30 can be an epoxy casting material, an epoxy surface material, or a hybrid material of epoxies and granular or powdered additives to enhance wear of the surface material 30. The surface material 30 can be sprayed on, brushed on, cast and post bonded. The surface material 30 is then machined to provide the defined surface of the fixture to which the workpiece (e.g. windshield 15 or other workpiece) is to be measured.

The plug core 12 provides the basic shape of the fixture 10, especially during fabrication. The skin layer 20 provides additional rigidity to the fixture 10 which is especially important when the plug core 12 is made of a material that changes shape due to environmental conditions, aging or other factors. The skin core 24, which is typically a honeycomb, is especially critical in providing rigidity of the skin layer 20 which is independent of the plug core 12. Thus, if the plug core 12 is made of a unstable or marginally stable material, the fixture 10 can retain its shape due to the rigidity of the skin layer 20. The advantage of independent rigidity in the skin layer 20 is that an inexpensive, light weight material can be used for the plug core 12, thus helping to free the designs from concerns about the structural rigidity of the plug core 12, and reducing the cost of fabricating the fixture 12.

Polystyrene is a light weight, inexpensive material that has been found to work well as the material for the plug core 12. A multi-layer skin layer 20 including an inner skin 22 made of carbon fiber and wet epoxy, a skin core 24 made of a honeycomb material, and an outer skin 26 made of carbon fiber and wet epoxy can be applied to the polystyrene plug core 12 without changing the size and shape of the polystyrene plug core 12. After the skin layer 20 cures, the surface material 30 can be applied to a portion of or all of the skin layer 20. The surface material 30 can then be machined to match the requirements for measurement of the workpiece.

The combined rigidity of the polystyrene plug core 12 and the skin layer 20, which includes the skin core 24, provides a rigid fixture 10 which is strong, light weight and has negligible size and shape changes due to environmental changes, aging and other factors. If environmental and/or aging conditions cause the polystyrene plug core 12 to expand, the weak expansion strength of the polystyrene can be resisted by the carbon fiber and honeycomb material of the skin layer 20. Thus, the fixture 10 maintains its shape despite the attempted expansion by the plug core 12. If the conditions cause the polystyrene to contract, the independent rigidity of the skin layer 20, especially due to the skin core 24, enable the fixture 10 to maintain its shape despite the contraction of the plug core 12.

The fixture 10 can also be made relatively quickly and inexpensively. The only portion of the fixture 10 having tight tolerances is the surface material 30. The plug core 12 and skin layer 20 do not have tight tolerances. The skin layer 20, in the preferred process, is formed in a single step process. In this single step process all of the layers of the skin layer 20 are applied to the plug core 12 and the base 14 and cured in a single curing period. The loose tolerances on the plug core 12 and the skin layer 20, the single curing period, and the absence of steps required to remove the plug core 12 and insert support structures, allows the main body 28 of the fixture 10 to be made rapidly and inexpensively. The surface material 30 can then be applied and machined to the required specifications.

It will be understood that various modifications can be made to the apparatus disclosed in this application without changing the spirit and scope of the invention.

I claim:

1. A solid core gauging fixture for measuring the dimensions of a workpiece placed thereon simultaneously in at least two dimensions, the gauging fixture comprising:

an integral solid core made of a homogeneous material, a single molded continuous skin layer covering the solid core wherein the skin layer provides containment for the solid core, and a distinct surface material covering a portion of the skin layer, the surface material being capable of forming a workpiece receiving surface for receiving the workpiece in predetermined position thereon for facilitating measuring the workpiece, whereby the workpiece is measured on the fixture by reference to its dimensional deviation from a dimension of an idealized workpiece.

2. The solid core gauging fixture of claim 1, wherein the skin layer includes a skin core.

3. The solid core gauging fixture of claim 1, wherein the skin layer comprises an inner skin covering the solid core, a skin core having an inner surface and an outer surface, the inner surface being attached to the inner skin; and an outer skin attached to the outer surface of the skin core.

4. The solid core gauging fixture of claim 3, wherein the solid core is made of polystyrene or similar material, and the skin is made of carbon or glass fiber with thermoset resins with the inner skin, skin core and outer skin molded in one process.

5. The solid core gauging fixture of claim 1, wherein the inner skin, the skin core and the outer skin are applied and molded in a single process and are cured during a single curing period.

6. A solid core gauging fixture for measuring a produced workpiece, the gauging fixture comprising: a solid core made of a homogeneous material, a skin layer covering and providing containment for the solid core, and a workpiece receiving area configured for receiving the produced workpiece thereon, the workpiece receiving area being comprised of a distinct material for permitting the user to form the surface area to correspond to an idealized workpiece and for receiving the produced workpiece in a desired position thereon, whereby the workpiece is measured on the fixture by reference to its dimensional deviation from the idealized workpiece.

7. The solid core gauging fixture of claim 6 wherein the distinct material of the workpiece receiving area is formable in three dimensions to form, on the workpiece receiving area, a workpiece mating surface for matingly receiving the workpiece to be placed on the workpiece receiving area.

8. The solid core gauging fixture of claim 7, wherein the distinct material comprises a layer separate from the skin layer that is applied to the gauging fixture.

9. The solid core gauging fixture of claim 7 wherein the workpiece receiving area is formable to form a mating contour of an ideal workpiece having predetermined dimensions and curvatures, whereby the dimensions of a subsequent workpiece placed on the workpiece receiving area is measured by comparing the fit of the subsequent workpiece to the mating contour of the ideal workpiece.

10. A solid core gauging fixture for measuring a workpiece, the fixture comprising:

an integral solid core made of a homogeneous material, a skin layer covering and containing the solid core, the skin layer being comprised of a material sufficiently dimensionally stable so as to undergo no measurably significant compression under the weight of the workpiece, and a workpiece positioning and measurement surface for receiving a workpiece thereon, the workpiece positioning and measurement surface being comprised of a distinct material for permitting the user to form the surface area for fittingly receiving the workpiece, whereby the workpiece is measured with reference to the dimensional deviation of the workpiece from an idealized workpiece.

11. The solid core gauging fixture of claim 10 wherein the dimensionally stable material from which the skin layer is comprised includes carbon or glass fiber with thermoset resins that fully contains the integral solid core.

12. The solid core gauging fixture of claim 10 wherein the skin layer comprises an inner skin covering the solid core, a skin core attached to the inner skin and an outer skin attached to the outer surface of the skin core.

13. The solid core fixture of claim 10 wherein the skin layer comprises an inner skin covering the solid core, a skin core attached to the inner skin and an outer skin attached to the outer surface of the skin core, the inner skin, the skin core and the outer skin being applied and molded in a single process and cured during a single curing period.

14. The solid core fixture of claim 10, wherein the solid core is made of polystyrene or similar foam material, and the skin is made of carbon or glass fiber with thermoset resins with the inner skin, skin core and outer skin molded in one process.

15. A solid core gauging fixture for measuring a produced workpiece, the fixture comprising:

a solid core made of a foam material, a skin layer covering and containing the solid core, the skin layer being comprised of a dimensionally stable material including carbon or glass fiber with thermoset resins, and a workpiece receiving area for receiving a produced workpiece thereon, the workpiece receiving area being comprised of a distinct material for permitting the user to form the surface area for fittingly receiving an idealized workpiece, whereby the produced workpiece is measured on the fixture by reference to its dimensional deviation from the idealized workpiece.

16. A solid core gauging fixture for measuring a workpiece having a non-linear contour containing first surface, the fixture comprising:

a solid core made of a homogeneous material, a skin layer covering and containing the solid core, and a workpiece receiving area for receiving a workpiece thereon, the workpiece receiving area being comprised of a distinct material for permitting the user to form the surface area in three dimensions for including a mating contour for matingly receiving the contour of the first surface of the workpiece, the mating contour being shaped and dimensioned for receiving an idealized workpiece, whereby the workpiece is measured on the fixture by reference to its dimensional deviation for the idealized workpiece.

17. A solid core gauging fixture for measuring a workpiece, the fixture comprising:

an integral solid core made of a homogeneous material, a skin layer covering and containing the solid core, and a workpiece receiving area for receiving a workpiece thereon, the workpiece receiving area being comprised of a distinct material applied to the fixture after the formation of the solid core and skin layer.

* * * * *